J. O. HOBBS.
FLEXIBLE DRIVE SHAFT.
APPLICATION FILED JUNE 30, 1911. RENEWED JAN. 2, 1917.
1,232,922.  Patented July 10, 1917.
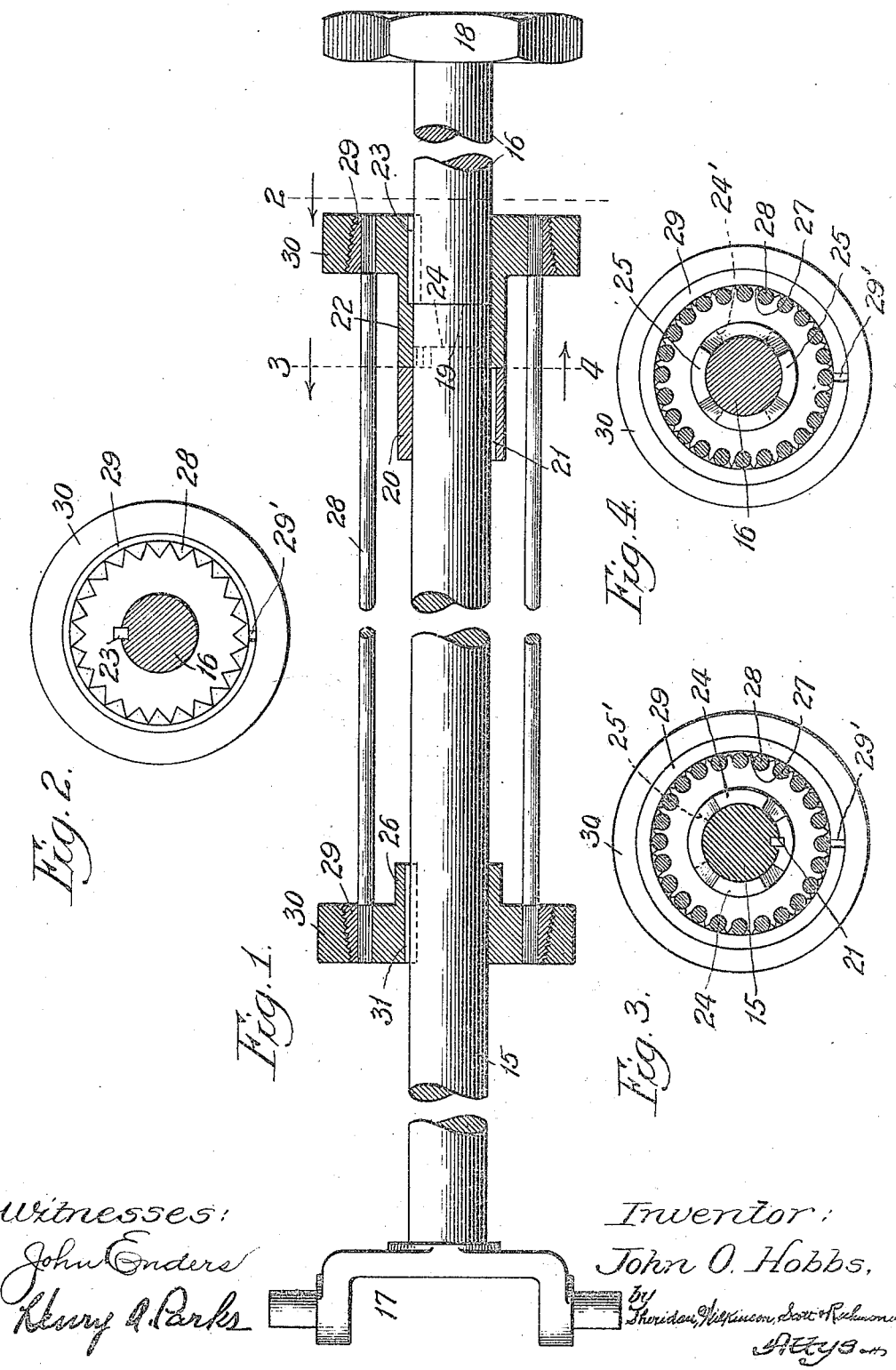
Witnesses:
John Enders
Henry A. Parks
Inventor:
John O. Hobbs
by
Sheridan, Wilkinson, Scott & Richmond
Attys

UNITED STATES PATENT OFFICE.

JOHN O. HOBBS, OF CHICAGO, ILLINOIS.

FLEXIBLE DRIVE-SHAFT.

1,232,922.  Specification of Letters Patent.  Patented July 10, 1917.

Application filed June 30, 1911, Serial No. 636,196. Renewed January 2, 1917. Serial No. 140,303.

*To all whom it may concern:*

Be it known that I, JOHN O. HOBBS, a citizen of the United States, residing at Chicago, in the county of Cook and State of Illinois, have invented certain new and useful Improvements in Flexible Drive-Shafts, of which the following is a specification.

The principal object of my invention is to provide a new and improved device for transmitting power yieldingly by means of a rotating shaft. Another object of my invention is to provide a superior mechanical construction for a flexible power-transmitting device. Still another object of my invention is to provide a power-transmitting device adapted to yield increasingly against increasing torque up to a certain limit. Other objects of my invention relate to the construction and mode of assembling the apparatus and the uses thereof, which will all become apparent on consideration of a specific embodiment of my invention described in this specification.

Referring to the drawings—

Figure 1 is an elevation, partly in section, showing my improved flexible power-transmitting device.

Fig. 2 is a cross section on the line 2 of Fig. 1, looking in the direction of the arrow.

Fig. 3 is a section approximately on the line 3—4 of Fig. 1, looking in the direction of the arrow adjacent to the numeral 3; and Fig. 4 is a section on the same line, looking in the opposite direction—that is, looking in the direction of the arrow adjacent to the numeral 4.

The two shafts 15 and 16 are in alinement, with their adjacent ends at 19. The shaft 15 carries a member 17 for a universal joint at one end, and the shaft 16 carries a member 18 for a socket connection. In the particular embodiment shown in the drawings the universal joint of which the yoke 17 is an element, may be driven by the gasolene engine of an automobile through an intermediate clutch not shown. Likewise, the head 18 may connect with the differential gear mechanism on the secondary shaft or the rear shaft of the automobile for driving the rear wheels. The entire shaft 15—16 will thus constitute a flexible driving shaft between an engine driven member mounted on the chassis on the one hand, and the differential gear mechanism mounted on the secondary shaft or the rear axle shaft on the other hand.

The collar 20 fastened on the end of the shaft 15, by the key 21, has jaws 24 which lock with corresponding alternating jaws 25 projecting from the collar 22, fastened on the shaft 16 by the key 23. These alternating jaws 24 and 25, carried by the respective shafts 15 and 16, do not fit closely together, but permit the rotation of one shaft relatively to the other, about 24° in either direction. This angular displacement is indicated on Fig. 3 by the space between the dotted line 25′ and the solid line to the right thereof, which indicates the edge of the jaw 24.

The collar 22, already mentioned, which is keyed on the shaft 16, has a projecting part extending clear around and sharply notched so as to make a circumferential series of teeth 27. Another collar 26 is fastened by the key 31 on the shaft 15, and this has a similarly notched periphery 27.

A circumferential series of round steel rods 28 have their ends lying in respective corresponding notches of the two collars 22 and 26. The ends of these rods 28 are formed as triangular prisms so that they fit closely into the notches of the collars 22 and 26. Surrounding the ends of the rods 28 are split rings 29, the slight opening between the ends being indicated at 29′ on Figs. 2, 3 and 4. Of these split rings 29, each has a taper on its external surface with screw-threads cut in this surface. Outside of each tapered-screw-threaded split ring 29 is a heavy solid ring 30, internally tapered and screw-threaded to fit over and engage the corresponding ring 29.

Solid shafts can readily be cut across—as at the point 19—and equipped with my improved yielding connection. In any case, after the collars 22 and 26 have been fixed on the respective alining shafts 15 and 16 and the rods 28 put in place in the notches on those two collars, then the split rings 29 can be placed over the ends of the rods 28 and the outer solid rings 30 screwed upon them. This will clamp the rods 28 very tightly in the notches between the teeth 27. A torque applied to the shaft 15 will be distributed and transmitted through all the rods 28 to the shaft 16. The greater this torque, the greater will be the angle by which the shaft 15 will lead the shaft 16. A positive limit to the displacement is afforded by the interlocking jaws 24 and 25.

It will be observed that the device is equally effective to transmit power by means of a torque in either direction. As applied to an automobile, it will be seen that it is equally effective for forward or backward movement of the automobile.

The device is simple and not likely to become deranged in use, and can be readily applied to solid shafts by cutting them across and cutting key slots in the parts.

As applied to automobiles, it makes them run more smoothly, absorbs the shocks and jars due to explosions in the engine or to engaging the clutch, or due to the driving wheels of the automobiles running against obstacles or over obstructions. These and other objects will be readily appreciated by those skilled in the art to which the invention relates.

I claim:

1. A flexible power-transmitting device for transmitting rotary motion comprising two shafts in alinement, collars on the respective shafts, elastic rods, each having its ends engaging the respective collars, and means surrounding the ends of the rods arranged to clamp them tightly to said collars.

2. A flexible power-transmitting device comprising two shafts in alinement, notched collars on the respective shafts, elastic rods each having its ends lying in corresponding notches of the two collars, split rings surrounding the ends of said rods, and solid rings outside the split rings engaging the same by tapered threads.

3. A flexible power-transmitting device comprising two shafts in alinement, notched collars on the respective shafts, elastic metallic rods each having its ends lying in corresponding notches of the two collars, and clamping means surrounding said collars and the ends of said rods and adapted to clamp them tightly to said collars.

4. A flexible power-transmitting device comprising two shafts in alinement, sleeves keyed on the adjacent ends of said shafts, said sleeves having alternate interlocking jaws spaced apart so as to permit limited angular displacement of one shaft relatively to the other, collars keyed on said shafts beyond the sleeves, elastic yielding rods having their ends adjacent to said collars, and clamping means to secure the ends of said rods to the respective collars in rigid engagement therewith.

5. A flexible power-transmitting device comprising two shafts in alinement, collars on the respective shafts, elastic rods, each having its ends lying adjacent to the peripheries of the two collars, adjustable clamping means surrounding the ends of said rods, and interlocking means mounted on the ends of the two shafts adapted to permit limited angular displacement of one shaft relatively to the other but positively limit such angular displacement.

6. A flexible power-transmitting device comprising two shafts in alinement, notched collars on the respective shafts, elastic rods each having its ends lying in corresponding notches of the two collars, split rings surrounding the ends of said rods, solid rings outside the split rings engaging the same by tapered threads, and a jaw clutch having its respective members mounted on the adjacent ends of the two shafts with its jaws interlocking, said jaws being spaced apart so as to permit a limited angular displacement of one shaft relatively to the other.

7. A flexible power-transmitting device comprising two shafts in alinement, notched collars on the respective shafts, elastic rods each having its ends lying in corresponding notches of the two collars, and clamping means comprising a screw threaded member surrounding the ends of said rods and adapted to clamp them tightly to said collars.

8. A flexible power-transmitting device comprising two shafts in alinement, sleeves keyed on the adjacent ends of said shafts, said sleeves having alternate interlocking jaws spaced apart so as to permit limited angular displacement of one shaft relatively to the other, notched collars having notches therein keyed on said shafts beyond the sleeves, elastic yielding rods having their ends shaped to fit the notches of said collars, and means to clamp the ends of said rods to the respective collars in rigid engagement therewith.

9. A flexible power transmitting device comprising two shafts in alinement, notched collars on the respective shafts, elastic metallic rods each having its ends lying in corresponding notches of the two collars, and clamping means comprising an integral clamping ring surrounding the ends of said rods and said collars and adapted to clamp them tightly to said collars.

10. A flexible power transmitting device comprising two shafts in alinement, notched collars on the respective shafts, elastic rods each having its ends lying in corresponding notches of the two collars, and clamping means comprising a screw clamping ring surrounding the ends of said rods and having an internal tapered thread.

11. A flexible power transmitting device for transmitting rotary motion comprising two alining shafts, collars on the respective shafts, elastic metallic rods each having its ends engaging the respective collars, and adjustable means for securing the ends of said rods in rigid engagement with said collars.

In testimony whereof, I have subscribed my name.

JOHN O. HOBBS.

Witnesses:
 HENRY A. PARKS,
 ANNA L. WALTON.

Copies of this patent may be obtained for five cents each, by addressing the "Commissioner of Patents, Washington, D. C."